US011292671B1

United States Patent
Jacober et al.

(10) Patent No.: US 11,292,671 B1
(45) Date of Patent: Apr. 5, 2022

(54) BELT PACKAGE CONDITIONER

(71) Applicant: INTELLIGRATED HEADQUARTERS, LLC, Mason, OH (US)

(72) Inventors: Michael Jacober, St. Louis, MO (US); Jeffrey A. Marsh, Collinsville, IL (US); James D. Wilson, II, Collinsville, IL (US); Grant R. Jeremiah, Steeleville, IL (US); John E. Simons, St. Louis, MO (US); Benjamin H. Baer, Kirkwood, MO (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 17/038,067

(22) Filed: Sep. 30, 2020

(51) Int. Cl.
*B65G 47/00* (2006.01)
*B65G 43/08* (2006.01)

(52) U.S. Cl.
CPC ............ *B65G 47/00* (2013.01); *B65G 43/08* (2013.01); *B65G 2203/0216* (2013.01); *B65G 2203/044* (2013.01)

(58) Field of Classification Search
None
See application file for complete search history.

(56) References Cited

U.S. PATENT DOCUMENTS

| | | | |
|---|---|---|---|
| 3,581,876 A | 6/1971 | Keith | |
| 5,758,245 A * | 5/1998 | Matsuura | ........... G03G 15/2064 219/216 |
| 8,683,903 B2 | 4/2014 | Strong et al. | |
| 2011/0232239 A1 | 9/2011 | Winter et al. | |
| 2016/0282191 A1 | 9/2016 | Hocker et al. | |
| 2018/0031494 A1 | 2/2018 | Mills | |

FOREIGN PATENT DOCUMENTS

| | | |
|---|---|---|
| CA | 2274234 C | 1/2007 |
| CN | 110329611 A | 10/2019 |
| EP | 0242594 A1 | 10/1987 |

OTHER PUBLICATIONS

Dynamic Conveyor Corporation, "DynaClean Catenary Sag", YouTube, <https://www.youtube.com/watch?app=desktop&v=teKDFHsTalc&t=27s>, Oct. 8, 2018.
Inpak Systems, "Bag Flattening Conveyor | Express Scale BF 2414 Bag Flattener", YouTube, <https://www.youtube.com/watch?app=desktop&v=b_ALhGIRuAw>, Feb. 7, 2014.
Extended European search report dated Feb. 25, 2022 for EP Application No. 21198142, 8 pages.

* cited by examiner

*Primary Examiner* — Kavel Singh
(74) *Attorney, Agent, or Firm* — Alston & Bird LLP

(57) ABSTRACT

Various example embodiments described herein relate to an item conditioning assembly, which includes a support frame and a conditioning belt supported by the support frame so that a first portion of the conditioning belt is supported by the support frame at a first tension and a second portion of the conditioning belt is supported by the support frame at a second tension relatively lower than the first tension. The second portion of the conditioning belt can be suspended over a conveyor such that an item received between the conditioning belt and the conveyor, enters in an unconditioned state and is released in a conditioned state.

18 Claims, 11 Drawing Sheets

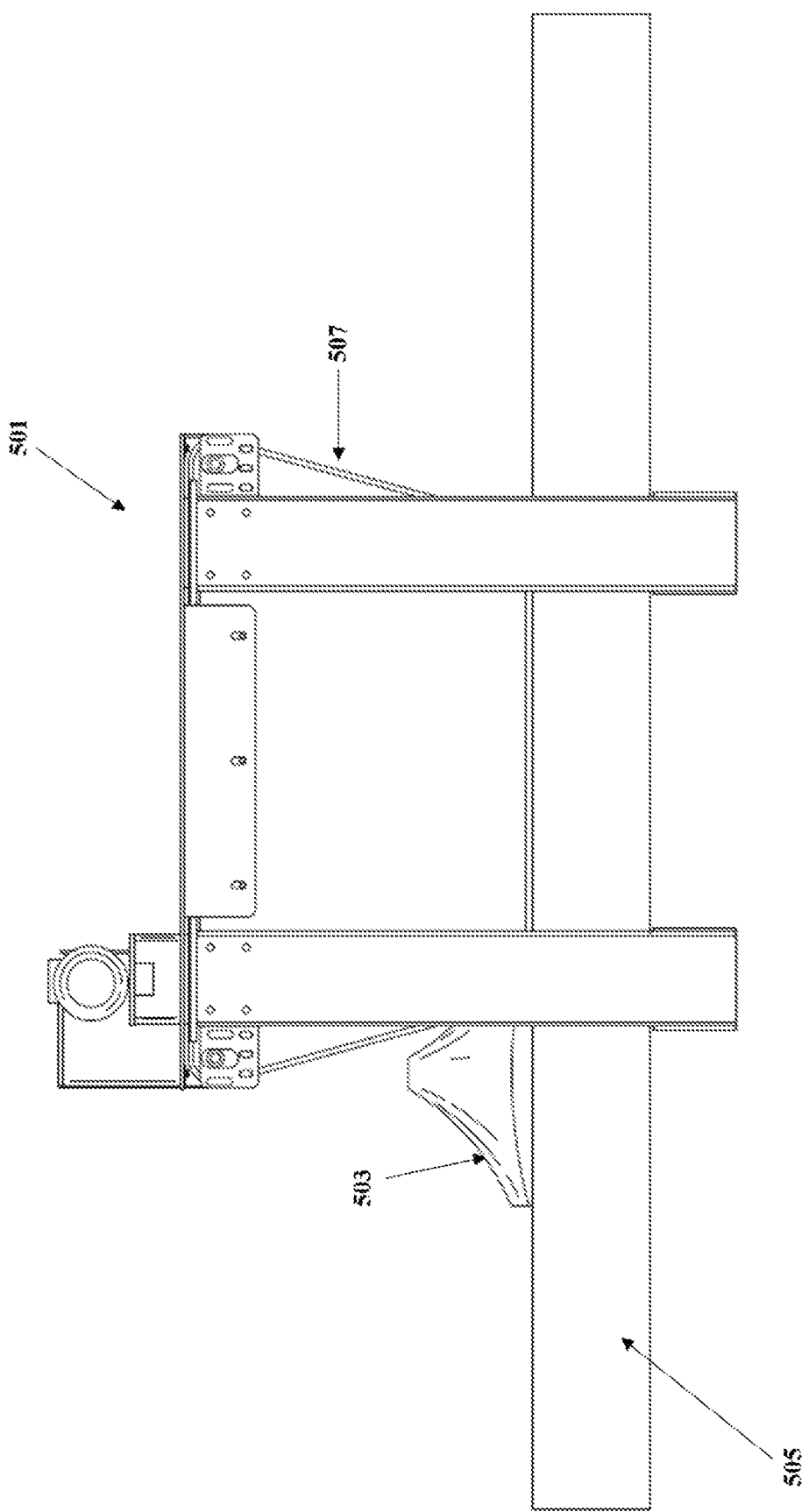

BELT PACKAGE CONDITIONER

TECHNICAL FIELD

Example embodiments described herein relate generally to a belt package conveyor system, and, more particularly, to a belt package conveyor system comprising rollers.

BACKGROUND

Generally, in a material handling environment, a material handling system can convey, handle, sort, and organize various types of items (e.g. cartons, cases, containers, shipment boxes, totes, packages, polybags, jiffy packaging, and/or the like). Occasionally, in such material handling environments, after an item has been picked up and placed by a packet picking robot, barcodes and shipping labels on the items can be unreadable by bar code scanners due to a distortion in the shape of the items. This can lead to serious challenges in material handling environments, as the success rates of reading labels can be affected by the items whose barcodes or shipping labels cannot be captured by the barcode scanners.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIGS. 5A-5D illustrate movement of an unconditioned item along an infeed conveyor to the item conditioning assembly in accordance with various aspects and embodiments of the subject disclosure.

DETAILED DESCRIPTION

Figure 1:
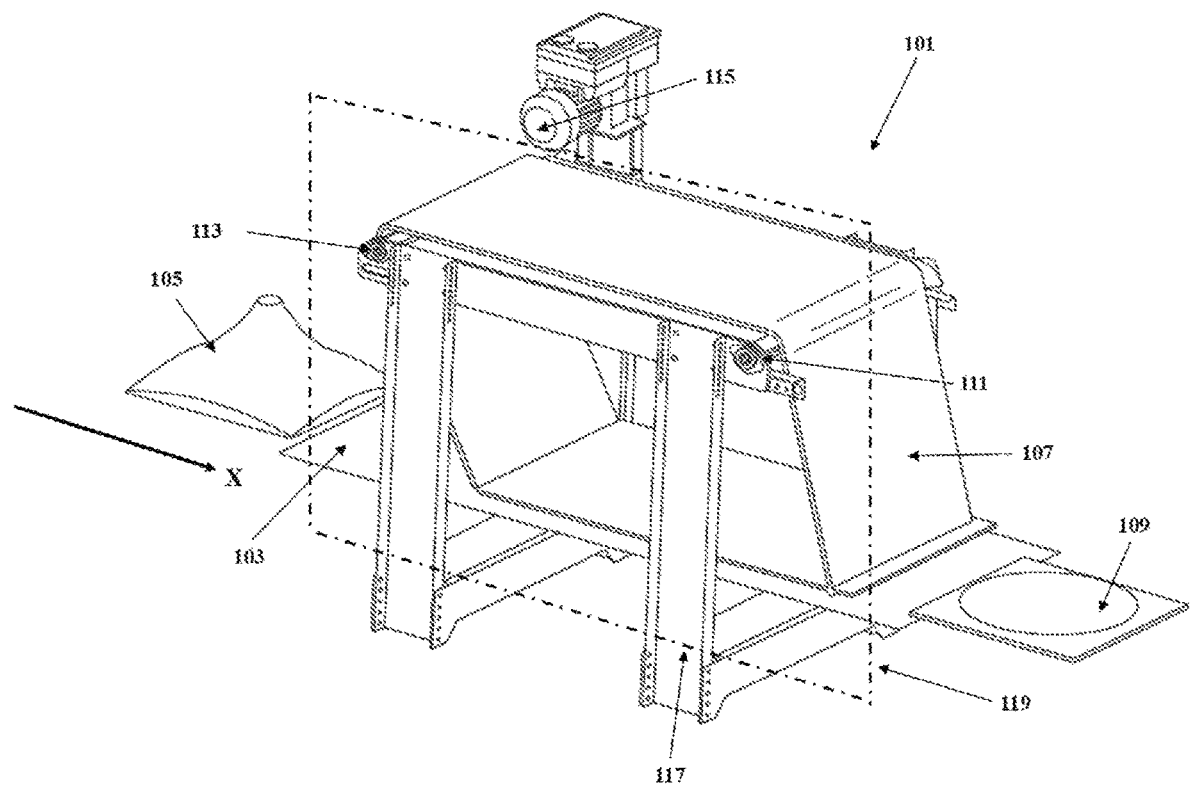
FIG. 1 illustrates an example item conditioning assembly in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details.

Various example embodiments described herein relate to an item conditioning assembly, which comprises a support frame, and a conditioning belt supported by the support frame so that a first portion of the conditioning belt is supported by the support frame at a first tension and a second portion of the conditioning belt is supported by the support frame at a second tension relatively lower than the first tension and wherein the second portion of the conditioning belt is suspended over a conveyor such that an item received between the conditioning belt and the conveyor, enters in an unconditioned state and is released in a conditioned state.

In another example embodiment, a system can comprise a first conveyor to convey an item. The system can also comprise a second conveyor comprising a conditioning belt, wherein the second conveyor is positioned with respect to the first conveyor so that a portion of the conditioning belt of the second conveyor is suspended over the conveyor belt of the second conveyor, and wherein the conditioning belt is at a predetermined tension such that the conditioning belt suspends from the second conveyor and contacts a portion of the item.

In yet another example embodiment, a method can comprise conveying, by a first conveyor, an item to a predetermined location. The method can also comprise conditioning, by a conditioning belt of a second conveyor, the item, wherein the conditioning belt of the second conveyor suspends from the second conveyor over the first conveyor and contacts the item as the item is conveyed to the predetermined location. The method can also comprise releasing, by the conditioning belt of the second conveyor, the item in a conditioned state.

After a pick and place operation by a packet picking robot in a material handling environment, some items can become misshapen due to the bulk handling of items by the packet picking robot. This can become a particularly critical problem when handling items having irregular shapes and relatively small sizes, such as polybags, envelopes, small packages, items containing perishables, etc. The surfaces of these items become either convex or concave after the pick and place operation by the packet picking robot, which leaves the barcode or shipping labels on these items in an unreadable state. Proper conditioning of these items is, thus, important to ensure that the items can be restored to their natural shape and the barcodes or shipping labels on these items can be conveniently read by a barcode scanner.

FIG. 1 illustrates an item conditioning assembly 101 according to the present disclosure. The item conditioning assembly 101 can include a conditioning belt 107 and a support frame 117. The conditioning belt 107 can be wrapped around at least two rollers 111, and 113 to form a suspended conveyor system 119 such that the conditioning belt 107 hangs above the conveyor belt of the infeed conveyor 103. A portion of the conditioning belt 107 wrapped around the two rollers 111 and 113 can be held at a first tension and the portion of the conditioning belt 107 which hangs above the conveyor belt of the infeed conveyor 103 can be held at a second tension.

Maintaining the portion of the conditioning belt 107 which hangs above the conveyor belt of the infeed conveyor 103 at the second tension allows the conditioning belt 107 to sag. The weight of the sagging conditioning belt 107 works to condition the unconditioned item 105 by gently compressing the unconditioned item 105 into shape and releases the conditioned item 109. In one or more of the embodiments of the present application, the second tension and the height of the suspended conveyor system 119 can be adjusted based on a type of item to be conditioned. In some embodiments, the system can detect the size and the type of items using sensor such as cameras, photosensors, LIDAR, etc. and then automatically adjust the height and the second tension of the conditioning belt 107 to the optimum value. In some examples, when small and fragile items are unconditioned, the system can be adjusted such that the conditioning belt 107 hangs above the conveyor belt of the infeed conveyor 103 at a lower height, but a higher second tension to ensure that the conditioning belt 107 does not damage the small and fragile items which need to be conditioned. In another example, larger packages with a stiffer and more robust build can be conditioned by maintaining the conditioning belt 107 at a lower second tension while maintaining a relatively larger gap between the conveyor belt of the infeed conveyor 103 and the portion of the conditioning belt 107 which hangs above the infeed conveyor 103. In yet another example, polybags can be conditioned by maintaining the conditioning belt 107 at a very low height, such that it almost touches the conveyor belt of the infeed conveyor 103 and a very low second tension to ensure no damage is done to the polybags while conditioning. Similarly, different values of second tension and the height at which the conditioning belt 107 hangs over the conveyor belt of the infeed conveyor 103 can be used if the items to be conditioned are breakable items, clothes, electronic goods, food items, etc. In some embodiments, the speed at which the conditioning belt 107 moves over the conveyor belt of the infeed conveyor 103 can also be adjusted based on the type of item. The conditioning belt 107 can be mechanically coupled to a motor 115 to drive the conditioning belt 107 around the rollers 111 and 113.

An unconditioned item 105 moves forward on the infeed conveyor 103 in the X direction towards the conditioning belt 107 of the suspended conveyor system 119. The conditioning belt 107 of the suspended conveyor system 119 makes contact with the conveyor belt of the infeed conveyor 103 such that the unconditioned item 105 is flattened when it passes between the contacting surfaces of the conveyor belt of the infeed conveyor 103 and the conditioning belt 107 and released as a conditioned item 109.

In another embodiment, a single unconditioned item can be conditioned at a single time and the two rollers 111 and 113 around which the conditioning belt 107 is wrapped, can be kept a fixed distance. In another embodiment, the distance between the two rollers 111 and 113 may be variable so that multiple unconditioned items can be conditioned simultaneously. In yet another embodiment, a roller-bed of multiple rollers may be used, around which the conditioning belt 107 can be wrapped.

Figure 2:
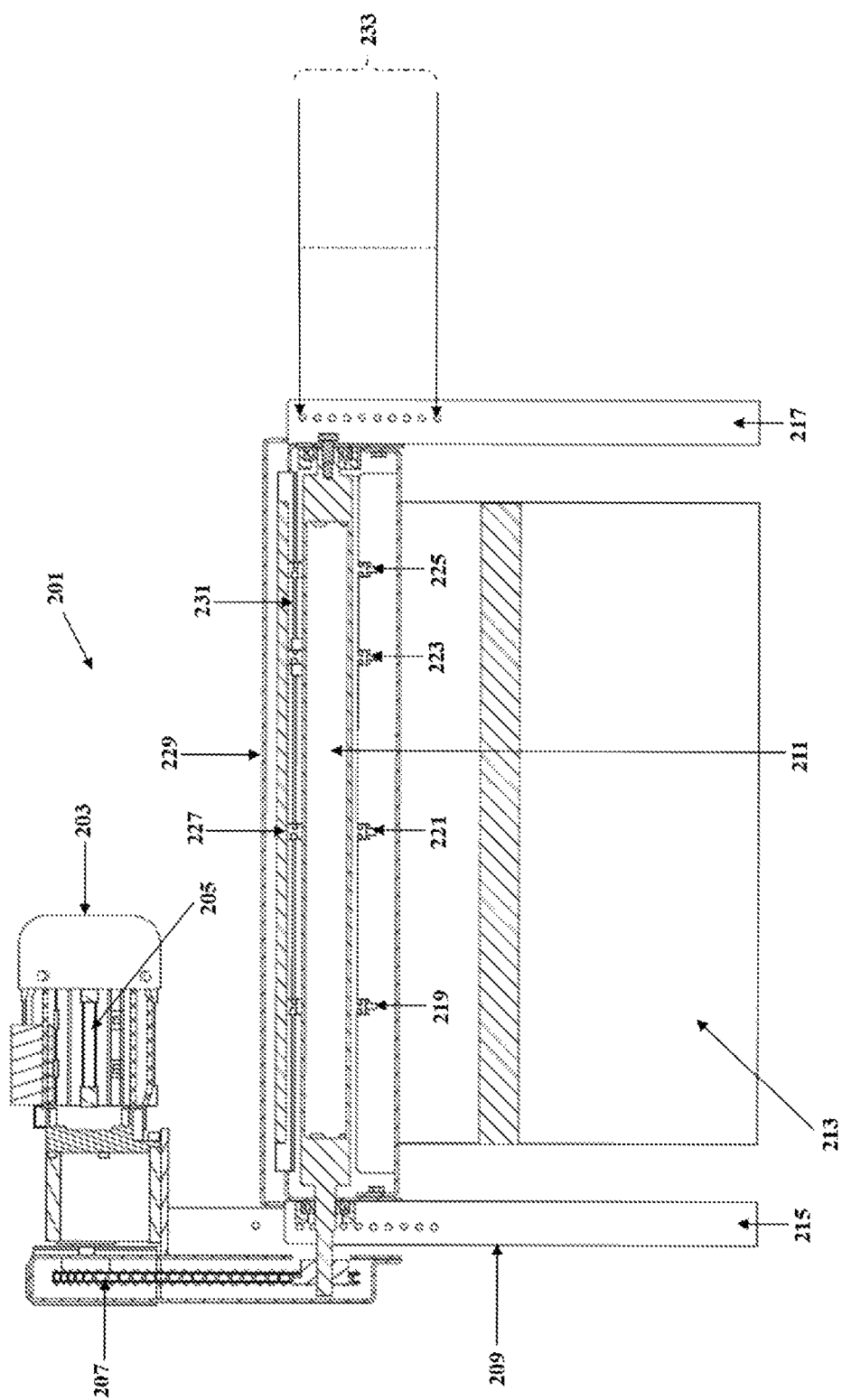
FIG. 2 illustrates a cross-sectional front view of an item conditioning assembly in accordance with various aspects and embodiments of the subject disclosure.

FIG. 2 illustrates a cross-sectional front view of the item conditioning assembly 201. In one embodiment, a motor 203 and a drive chain 207 can be mechanically coupled to a conditioning belt 229 of the item conditioning assembly 201. The motor 203 may have a roller drive shaft 205 to transmit torque and rotation of the motor 203 to the drive chain 207. The drive chain 207, which can be mechanically coupled to the conditioning belt 229, can drive the movement of the conditioning belt 229. The conditioning belt 229 can be present on a conveyor frame 209 and be wrapped around a steel plate 211. The steel plate 211 can be fixedly attached to the conveyor frame 209 using a screw, washer-nut, or a nut-bolt arrangement, such as 233. The conveyor frame 209 may have support legs 215, 217 which may be attached to the conveyor frame using a nut-bolt arrangement.

Figure 3:
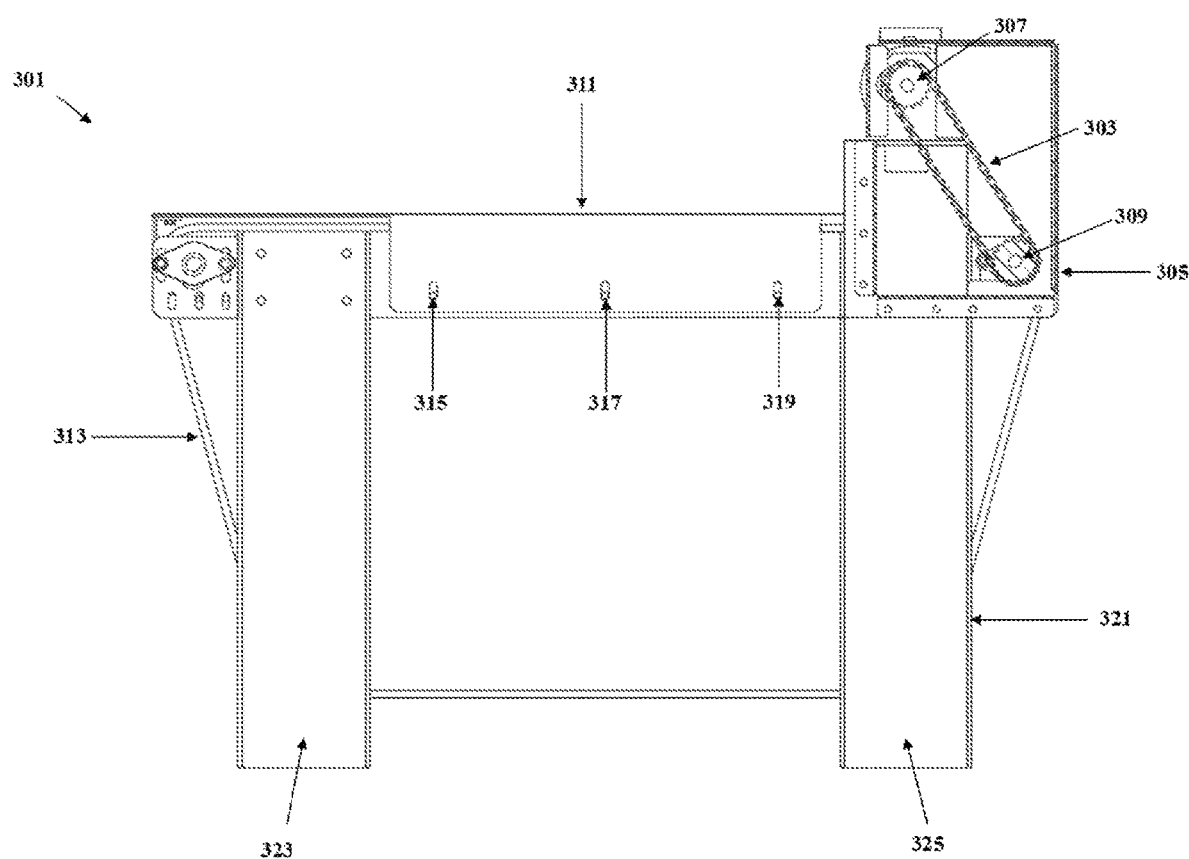
FIG. 3 illustrates a cross-sectional rear view of the item conditioning assembly in accordance with various aspects and embodiments of the subject disclosure.

FIG. 3 illustrates a cross-sectional rear view of the item conditioning assembly 301. In one embodiment, a drive chain 303, which can present within a frame 305, can be wound around two sprockets 307 and 309, the drive chain 303 being mechanically coupled to the conditioning belt 313. A frame top 311 can be attached to a conveyor frame 321, the conveyor frame 321 having two support legs 323 and 325, using screw, washer-nut, or nut-bolt arrangements such as 315, 317, and 319.

Figure 4:
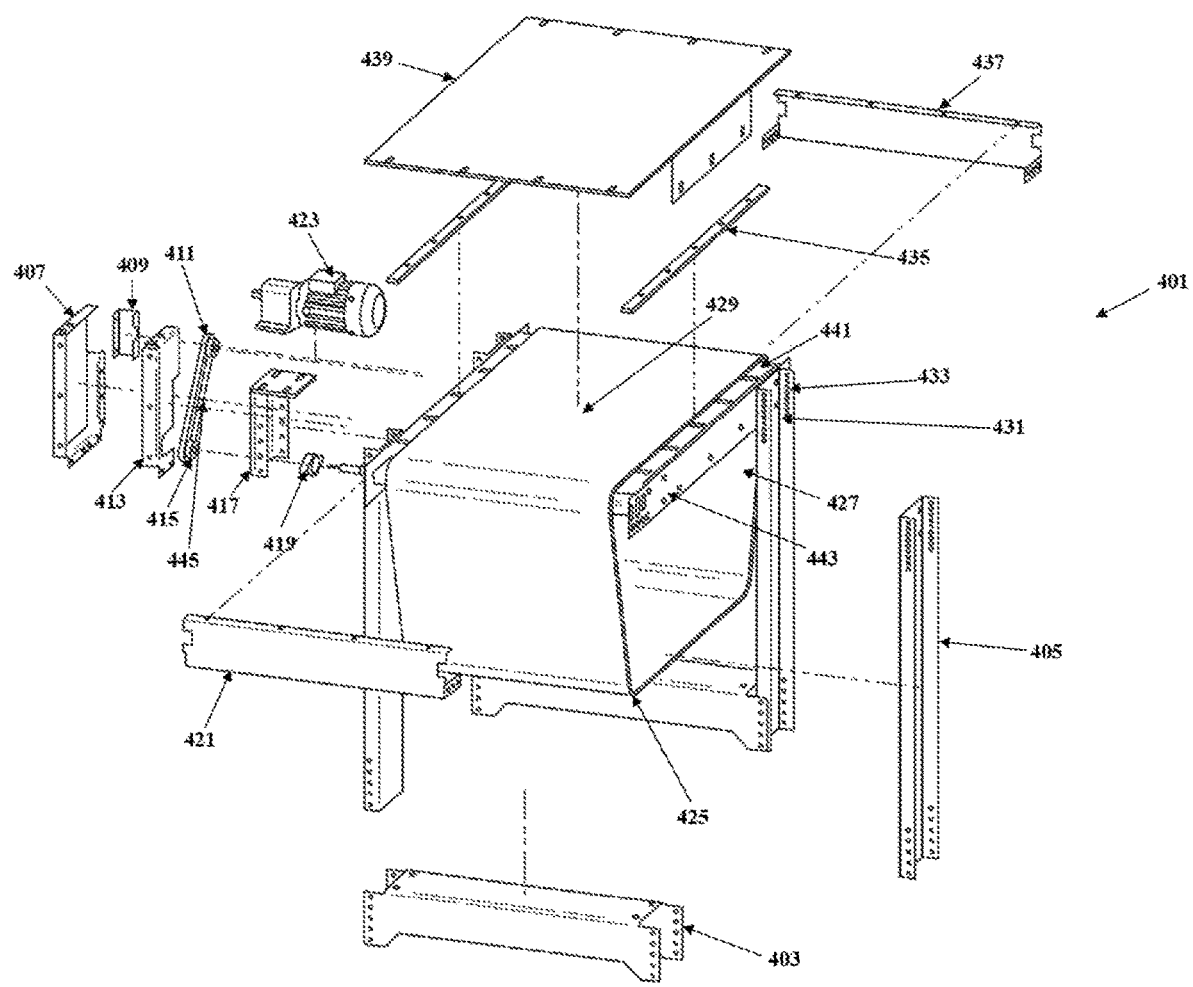
FIG. 4 illustrates an exploded view of an item conditioning assembly in accordance with various aspects and embodiments of the subject disclosure.

FIG. 4 illustrates an exploded view of an item conditioning assembly 401. The item conditioning assembly 401 can include a motor 423 and a conditioning belt 429. In one example embodiment, the upper portion of the conditioning belt 429 is wrapped around a steel plate 441 of a conveyor frame 427 and held a first tension. Vertical steel posts 405, 433 having apertures 431 can be attached to the conveyor frame 427 using a screw or nut-bolt arrangement. The steel plate 441 can have apertures along the length of its sides to engage steel bars such as 443, which can also have apertures in them and can be held in place above the steel plate 441 using screws or a nut-bolt arrangement. A frame top 439 may be attached on top of the steel bars such as 435 to cover the upper portion of the conditioning belt 429. The lower portion of the conditioning belt 429 can be left suspended above another conveyor surface below it carrying an unconditioned item and held at a second tension. A motor 423 and a chain or belt assembly 445 can be coupled to the upper portion of the conditioning belt 429 to drive the movement of the conditioning belt 429. The chain or belt assembly 445 can be wound around two drive rollers 411, 415 to maintain tension around it as it moves. A bracket 417 can be used to attach the chain assembly 445 to the main conveyor frame 427. The chain assembly 445 can be covered by frame cover plates 407, 409, and 413. Similarly, the side portions of the conveyor frame 427 can be covered by steel slats 421 and 437, with a screw, washer-nut or nut-bolt arrangement.

Figure 5A:
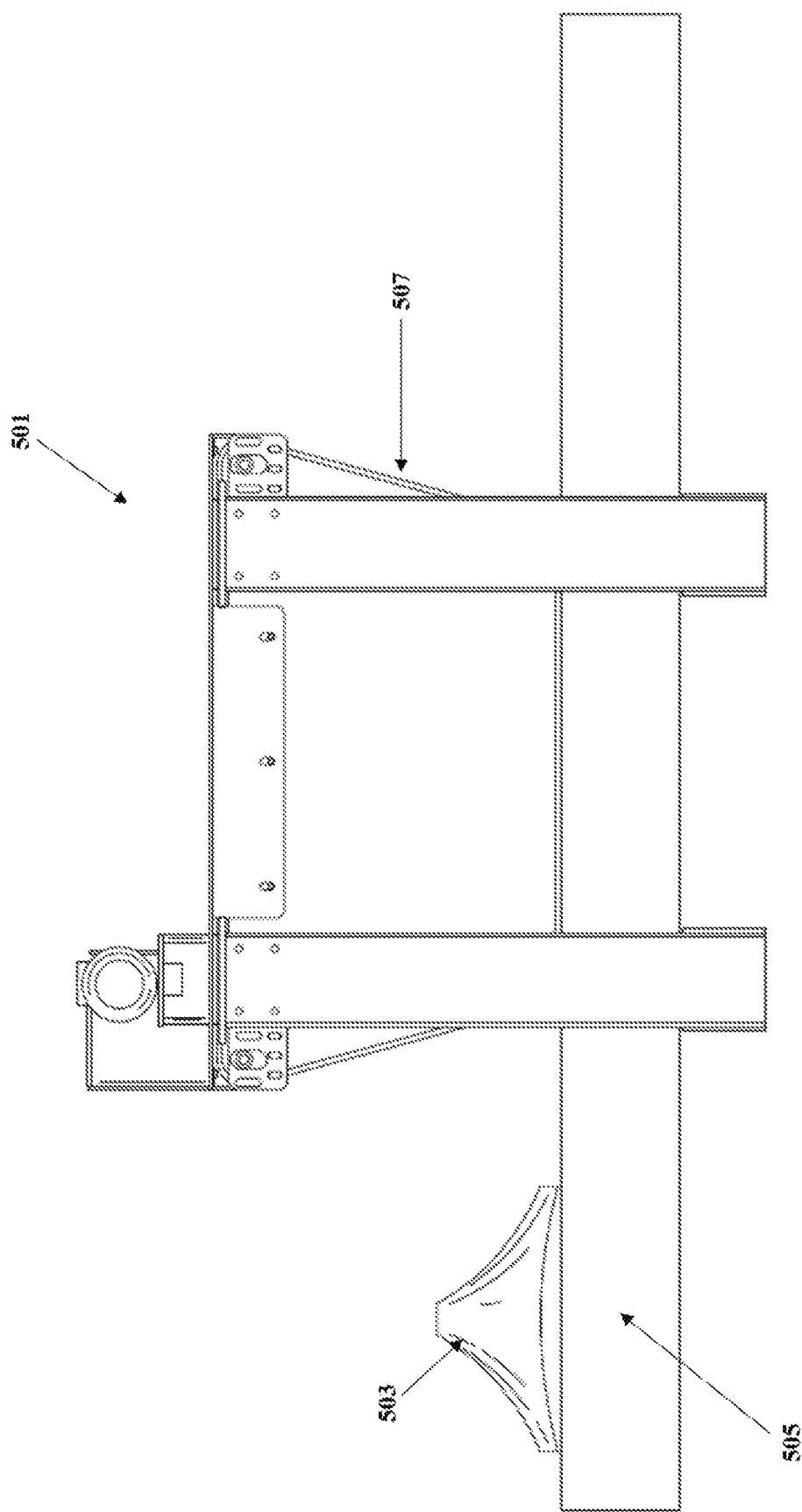

FIGS. 5A-5D illustrate the movement of an unconditioned item 503 along an infeed conveyor 505 to the item conditioning assembly 501. FIG. 5A illustrates that the unconditioned item 503, conveyed by the infeed conveyor 505 can travel towards a conditioning belt 507 of the item conditioning assembly 501.

FIG. 5B illustrates that a first portion of the unconditioned item 503 can pass in between the conditioning belt 507 of the item conditioning assembly 501 and the infeed conveyor 505.

Figure 5C:
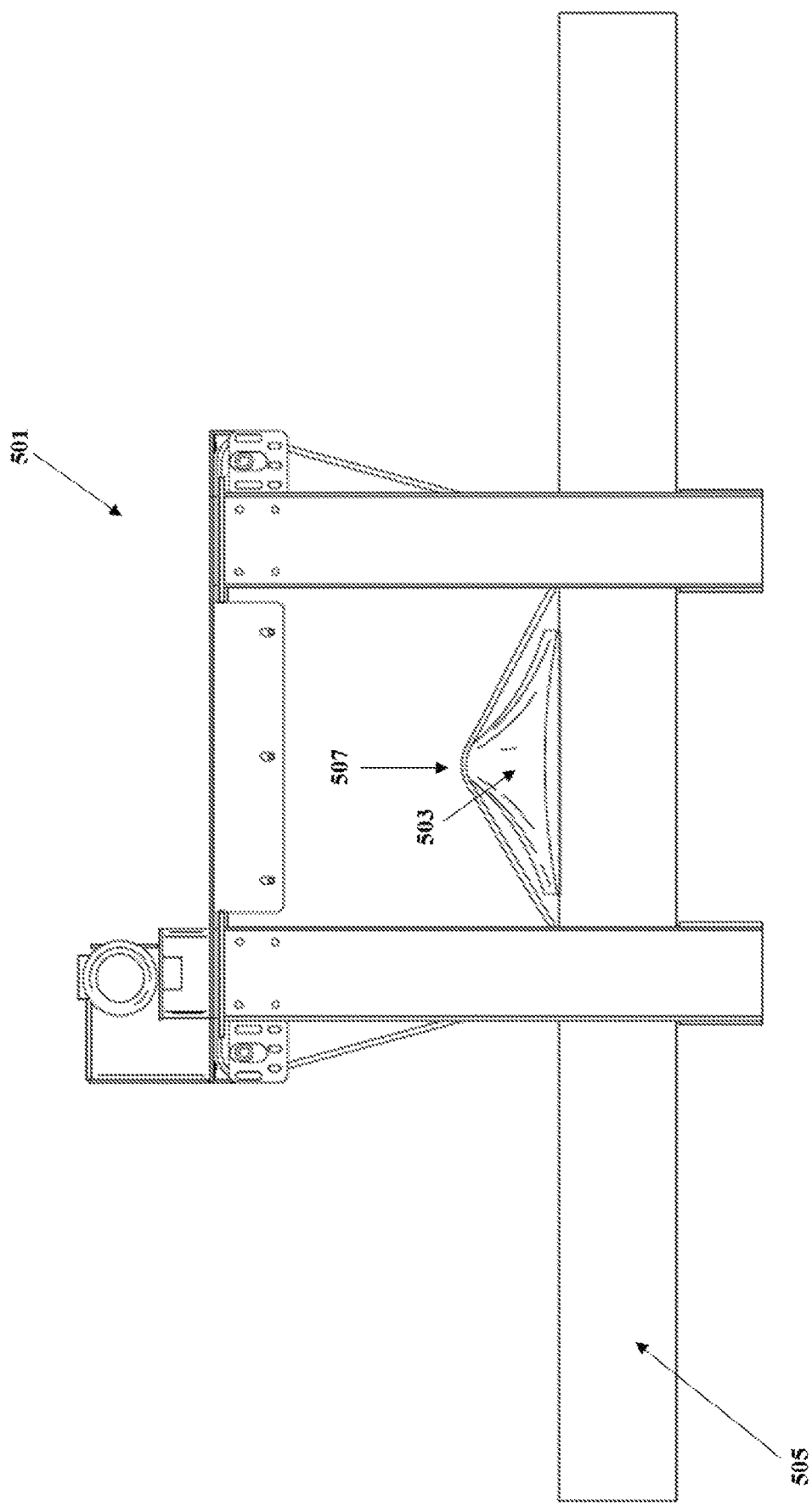

FIG. 5C illustrates that the unconditioned item 503 can pass in-between the conditioning belt 507 of the item conditioning assembly 501 and the infeed conveyor 505 to flatten the unconditioned item 503.

Figure 5D:
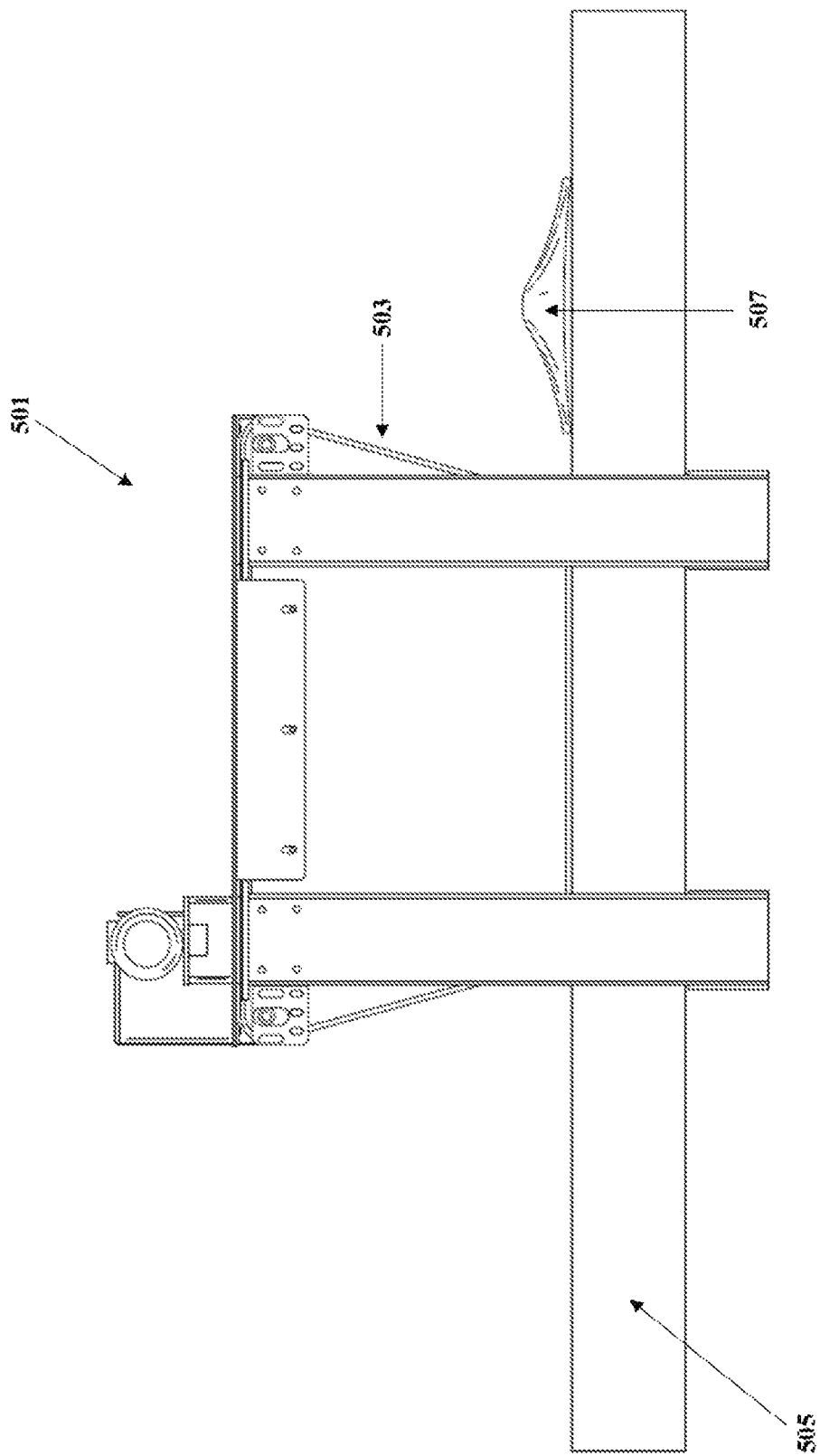

FIG. 5D illustrates that a conditioned item 507 which has passed between the conditioning belt 503 of the item conditioning assembly 501 and the infeed conveyor 505 which has been flatted by the conditioning belt 503.

Figure 6A:
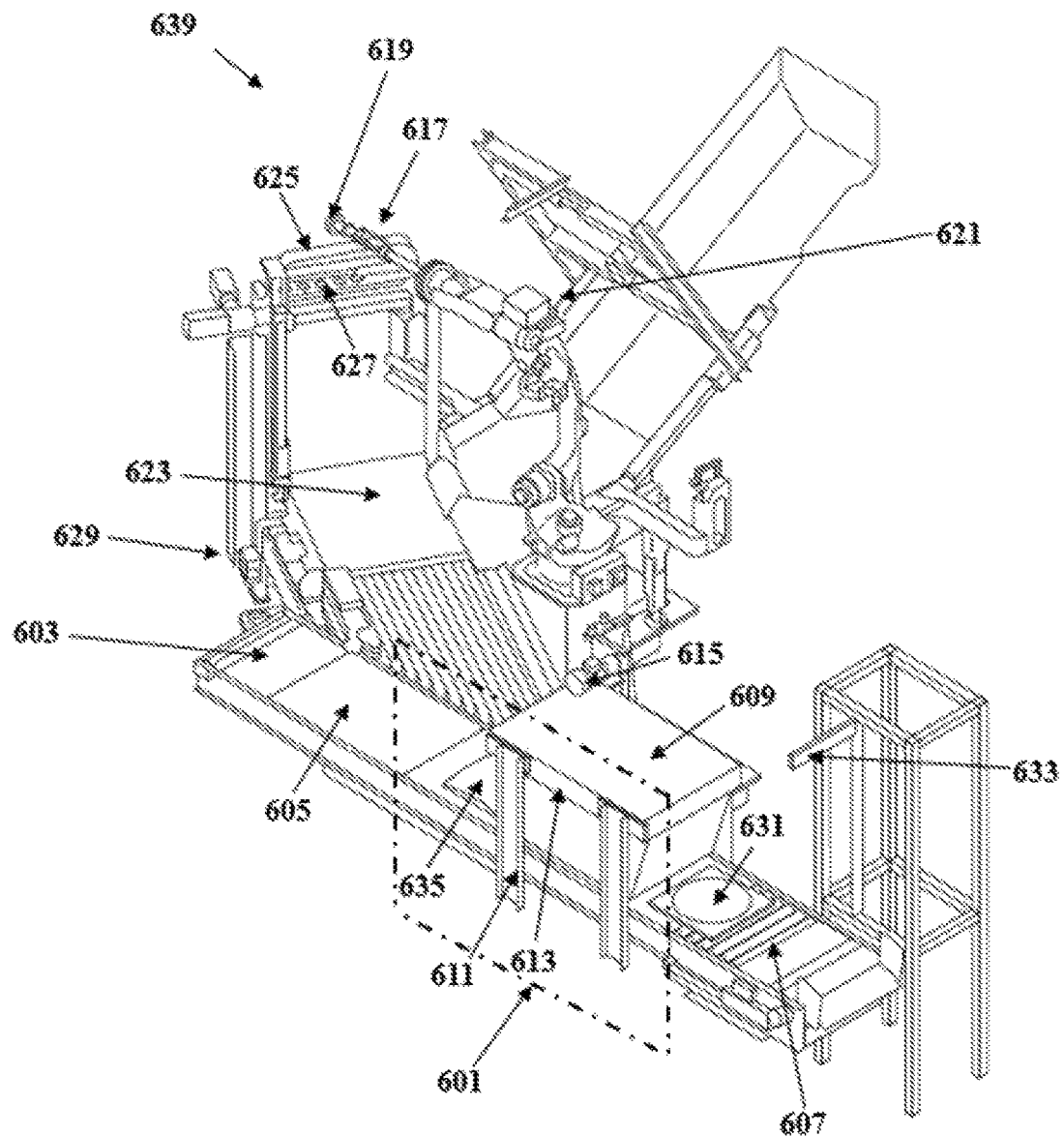
FIG. 6A illustrates a front view of a material handling environment in which an item conditioning assembly in accordance with various aspects and embodiments of the subject disclosure is installed.
Figure 6B:
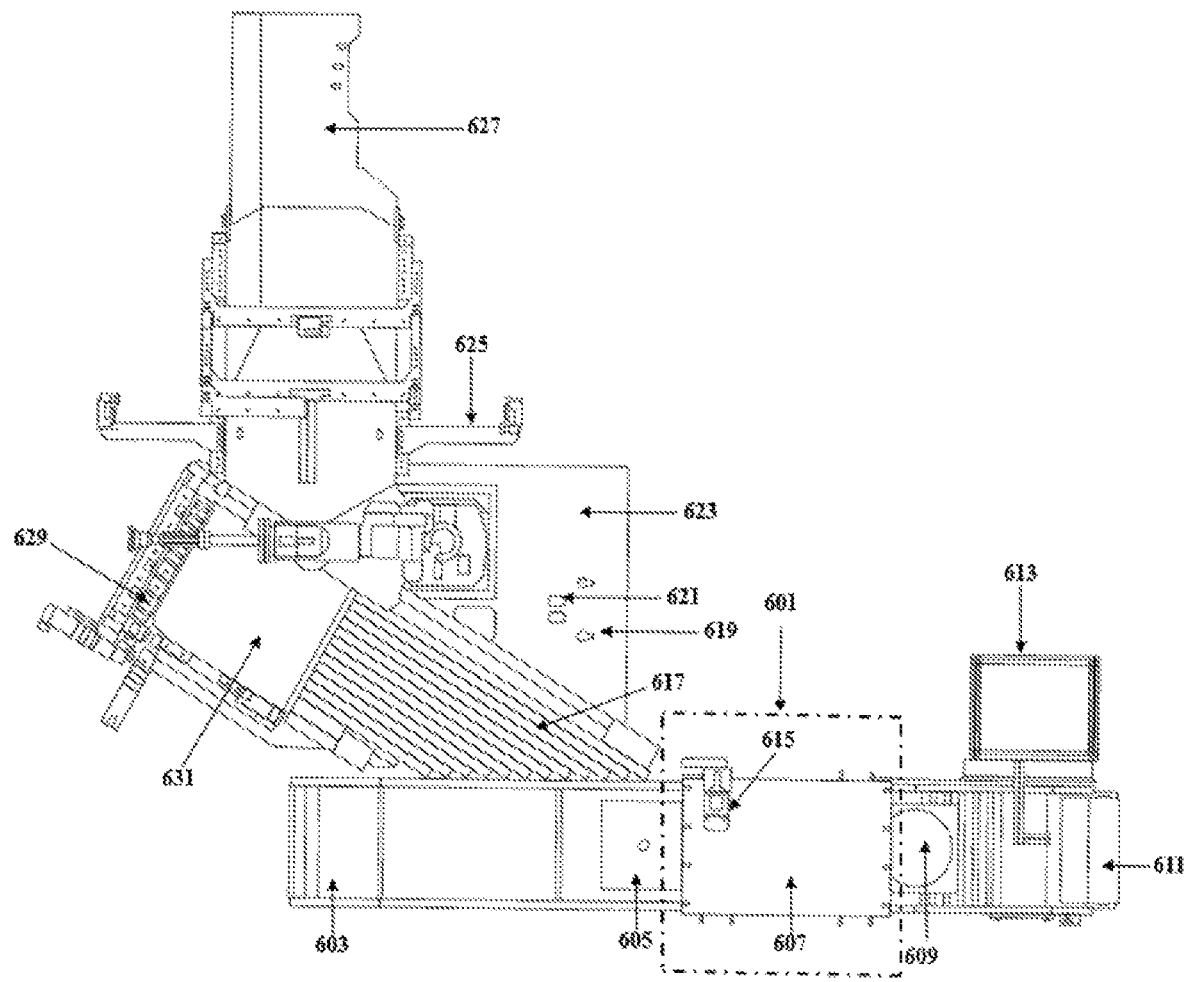
FIG. 6B illustrates a top view of a material handling environment in which an item conditioning assembly in accordance with various aspects and embodiments of the subject disclosure is installed.

In an example embodiment, the item conditioning assembly 601 is installed in a material handling environment 639, as illustrated by a front view of the material handling environment 639 in FIG. 6A and a top view in FIG. 6B. The material handling environment 639 can also include a robotic manipulator 621, an infeed conveyor 603 having a conveyor belt 605 and an outfeed conveyor 607. The item conditioning assembly 601 can include a conditioning belt 609 and a belt conditioner support frame 611. The conditioning belt 609 may be wrapped around a conveyor 613 such that the conditioning belt 609 can be suspended over the conveyor belt 605 of the infeed conveyor 603. The conditioning belt 609 is mechanically coupled to a motor 615 to drive the conditioning belt 609 around the conveyor 613. The robotic manipulator 621 further comprises a robotic arm 617 having an end effector 619. The end effector 619 can have a gripping means to have a conformable grasp on the items to be picked, such as vacuum cups, or robotic fingers.

The material handling environment 639 can include a chute, an unloading conveyor or a discharge conveyor 629, which transports items to a surface 623. The items transported on the surface 623 can have a barcode label, an RFID label, or a shipping label which contains information related to the items such as, the type, dimensions, weight of the items. A frame 625, comprising a scanner 627 can be present above the surface 623. The scanner 627 can be a photo-eye, a camera-unit, or any other scanning device that can scan the information present in the barcode label. In one embodiment, the scanner 627 can transmit a signal to a robotic manipulator 621 to indicate that the barcode label on an item present on the surface 623 has been successfully read. The scanner 627 can also transmit information such as the type, dimensions, weight of the item to the robotic manipulator 621. The robotic manipulator 621 can then pick the items for which the barcode label has been read successfully from the surface 623 and place them on a conveyor 629 for further processing. When the scanner 627 is unable to read the barcode label on an item due to excessive distortion in the shape of the item, the scanner 627 transmits another signal to a robotic manipulator 621 to indicate that the barcode label on the item has not been read successfully. The end effector 619 of the robotic manipulator 621 then picks the items for which the barcode label has not been read successfully from the surface 623 and places these items on the infeed conveyor 603.

The infeed conveyor 603 receives an unconditioned item 635 from the end effector 619 of the robotic manipulator 621. The unconditioned item 635 moves forward on the infeed conveyor 603 towards the conditioning belt 609 suspended over the infeed conveyor 603. The conditioning belt 609 hanging above the conveyor belt 605 of the infeed conveyor 603 can make contact with the conveyor belt 605 such that the unconditioned item 635 is flattened when it passes in-between the contacting surfaces of the conveyor belt 605 and the conditioning belt 609 and released as a conditioned item 631. A scanner 633 can be installed on the outgoing conveyor 607 receiving the conditioned item 631 to scan the barcode label on the conditioned item 631. The scanner 633 scans information from the barcode label of the conditioned item 631 and transmits this information to the robotic manipulator 621.

In one embodiment, scanner 633 may be placed on the robotic manipulator 621 to detect the position of the unconditioned item 635 placed on the infeed conveyor 603. If the unconditioned item 635 has been placed at an incorrect position on the infeed conveyor 603, that is, the unconditioned item 635 has been placed along the edges of the infeed conveyor 603 instead of the center, the scanner 633 may transmit a signal to the robotic manipulator 621 to pick the unconditioned item 635 and place it again on the infeed conveyor 603 in a correct position.

Figure 7:
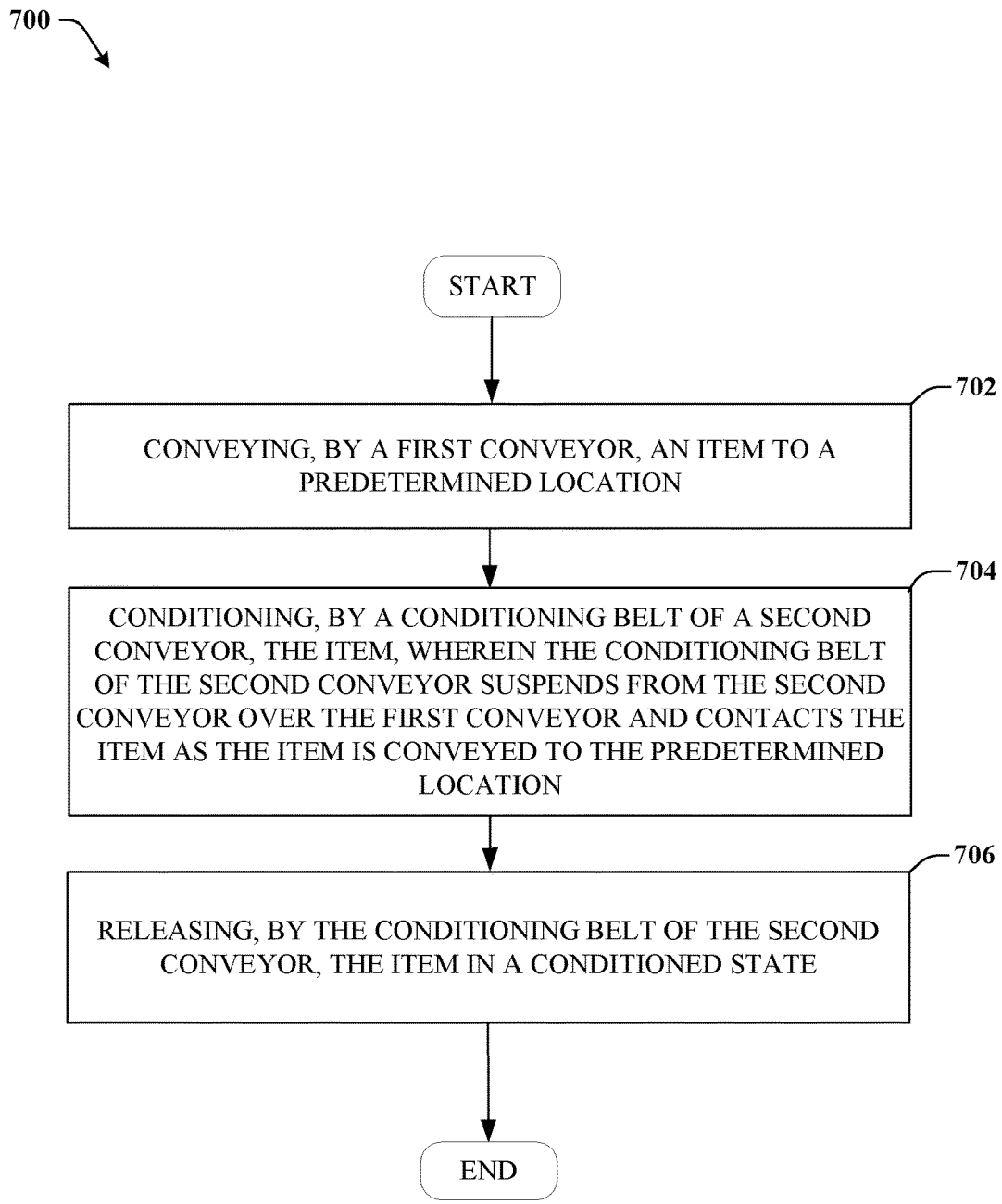
FIG. 7 illustrates a process in connection with an item conditioning assembly in accordance with various aspects and embodiments of the subject disclosure.

FIG. 7 illustrates a process in connection with the aforementioned systems. The processes in FIG. 7 can be implemented for example by the systems in FIGS. 1-6. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates an example flowchart a conditioning process in accordance with one or more embodiments of the subject disclosure.

At 702 the method comprises conveying a by a first conveyor an item to a predetermined location.

At 704 the method comprises conditioning, by a conditioning belt of a second conveyor, the item, wherein the conditioning belt of the second conveyor suspends from the second conveyor over the first conveyor and contacts the item as the item is conveyed to the predetermined location.

At 706 the method comprises releasing, by the conditioning belt of the second conveyor, the item in a conditioned state.

The words "example" or "exemplary" as used herein is to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. An item conditioning assembly, comprising:
   a support frame; and
   a conditioning belt supported by the support frame so that a first portion of the conditioning belt is supported by the support frame at a first tension and a second portion of the conditioning belt is supported by the support frame at a second tension relatively lower than the first tension and wherein the second portion of the conditioning belt is suspended over a conveyor and sags relative the support frame in a direction of the conveyor due to the relatively lower second tension such that an item received between the conditioning belt and the conveyor, enters in an unconditioned state and, via contact with the sagging second portion of the conditioning belt, is released in a conditioned state.

2. The item conditioning assembly of claim 1, wherein the conditioning belt sags from a conditioning conveyor.

3. The item conditioning assembly of claim 1 further comprising, a controller configured to operate a belt of the conveyor at a first speed and the conditioning belt at a second speed, wherein the first speed and the second speed are defined based on a characteristic associated with the item.

4. The item conditioning assembly of claim 3 wherein the controller is configured to modify at least one of: the first speed of the conveyor belt and the second speed of the conditioning belt, depending on the characteristic associated with the item.

5. The item conditioning assembly of claim 3 wherein the characteristic associated with the item comprises: a dimension of the item, a type of the item, a packaging material of the item, and the unconditioned state of the item.

6. The item conditioning assembly of claim 1, wherein the support frame comprises a first roller and a second roller and wherein the conditioning belt is mounted around the first roller and the second roller.

7. The item conditioning assembly of claim 1, wherein the conditioning belt is mechanically coupled to a motor and a chain drive assembly configured to drive a movement of the conditioning belt.

8. A system comprising:
a first conveyor to convey an item; and
a second conveyor comprising a conditioning belt, wherein the conditioning belt is supported by a support frame mechanically coupled to the second conveyor so that a first portion of the conditioning belt is supported by the support frame at a first tension and a second portion of the conditioning belt is supported by the support frame at a second tension relatively lower than the first tension and wherein the second conveyor is positioned with respect to the first conveyor so that the second portion of the conditioning belt of the second conveyor is suspended over a conveyor belt of the first conveyor and sags in a direction of the conveyor belt of the first conveyor due to the relatively lower second tension such that an item received between the conditioning belt of the second conveyor and the conveyor belt of the first conveyor enters in an unconditioned state and, via contact with the sagging second portion of the conditioning belt, is released in a conditioned state.

9. The system of claim 8, wherein the first conveyor is configured to operate the conveyor belt at a first speed and the second conveyor is configured to operate the conditioning belt at a second speed and wherein the first speed and the second speed are defined based on a characteristic associated with the item.

10. The system of claim 9 wherein the second conveyor is configured to modify the second speed of the conditioning belt depending on the characteristic associated with the item.

11. The system of claim 9 wherein the characteristic associated with the item comprises: a dimension of the item, a type of the item, a packaging material of the item, and the unconditioned state of the item.

12. The system of claim 8, wherein the support frame comprises at least two rollers over which the conditioning belt is mounted.

13. The system of claim 8 wherein the second conveyor comprises a motor and a chain drive assembly configured to drive a movement of the conditioning belt.

14. A method comprising:
conveying, by a first conveyor, an item to a predetermined location;
conditioning, by a conditioning belt of a second conveyor, the item, wherein the conditioning belt of the second conveyor is supported by a support frame mechanically coupled to the second conveyor so that a first portion of the conditioning belt is supported by the support frame at a first tension and a second portion of the conditioning belt is supported by the support frame at a second tension relatively lower than the first tension and the condition belt suspends from the second conveyor over the first conveyor and sags in a direction of the conveyor belt of the first conveyor due to the relatively lower second tension and contacts the item as the item is conveyed to the predetermined location; and
releasing, by the conditioning belt of the second conveyor, the item in a conditioned state.

15. The method of claim 14, comprising:
receiving the item in an unconditioned stated between the conveyor belt of the first conveyor and the conditioning belt of the second conveyor;
contacting a top portion of the item by the sagging second portion of the conditioning belt; and
conveying the item received between the conveyor belt and the conditioning belt for a defined distance by operating the conveyor belt at a first speed and the conditioning belt at a second speed.

16. The method of claim 14 further comprising, operating the conveyor belt at a first speed and the conditioning belt at a second speed and wherein the first speed and the second speed are defined based on a characteristic associated with the item.

17. The method of claim 14 further comprising:
capturing an image of an indicia on the item in the conditioned state; and
processing the image to decode the indicia.

18. The method of claim 14 comprising:
identifying a state of the item to be one of: an unconditioned state and a conditioned state;
in an instance, in which the state of item is identified to be conditioned state, pausing an operation of the second conveyor; and
in an instance, in which the state of the item is identified to be unconditioned state, initiating an operation of the second conveyor.

* * * * *